(12) United States Patent
Won et al.

(10) Patent No.: US 12,348,701 B2
(45) Date of Patent: Jul. 1, 2025

(54) DISPLAY DEVICE AND PANEL BONDING SYSTEM COMPRISING THE SAME

(71) Applicant: SAMSUNG DISPLAY CO., LTD., Yongin-si (KR)

(72) Inventors: Byeong Hee Won, Incheon (KR); Beom Shik Kim, Seoul (KR); Jeong Woo Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 47 days.

(21) Appl. No.: 18/185,075

(22) Filed: Mar. 16, 2023

(65) Prior Publication Data
US 2023/0328221 A1    Oct. 12, 2023

(30) Foreign Application Priority Data
Mar. 17, 2022 (KR) .................. 10-2022-0033595

(51) Int. Cl.
*H04N 13/344* (2018.01)
*H04N 13/398* (2018.01)

(52) U.S. Cl.
CPC ......... *H04N 13/344* (2018.05); *H04N 13/398* (2018.05)

(58) Field of Classification Search
CPC .. H04N 13/305; H04N 13/327; H04N 13/344; H04N 13/398

USPC .......................................................... 348/51
See application file for complete search history.

(56) References Cited

U.S. PATENT DOCUMENTS

| | | | | |
|---|---|---|---|---|
| 6,151,062 A | * | 11/2000 | Inoguchi | H04N 13/32 348/42 |
| 10,750,163 B2 | * | 8/2020 | Koerber | H04N 13/398 |
| 2013/0163078 A1 | * | 6/2013 | Saito | H04N 13/302 359/466 |
| 2018/0124386 A1 | * | 5/2018 | Kim | H04N 13/324 |
| 2021/0400254 A1 | * | 12/2021 | Ha | B32B 38/1833 |
| 2022/0037624 A1 | * | 2/2022 | Kim | H10K 50/865 |

FOREIGN PATENT DOCUMENTS

| | | | | |
|---|---|---|---|---|
| KR | 10-2017-0143339 | | 12/2017 | |
| KR | 10-2018-0049294 | | 5/2018 | |
| KR | 10-2016397 | | 8/2019 | |
| KR | 20220088542 A | * | 6/2022 | H04L 51/52 |

* cited by examiner

*Primary Examiner* — Behrooz M Senfi
(74) *Attorney, Agent, or Firm* — F. CHAU & ASSOCIATES, LLC

(57) ABSTRACT

A display device includes a display panel that includes a plurality of sub-pixels in a display area, an optical member attached to the display panel and that includes stereoscopic lenses, and a display driver that receives information on relative positions of the sub-pixels for each stereoscopic lens of the optical member from an optical member bonding apparatus, and corrects image data based on the relative positions of the sub-pixels so that 3D images are displayed in a display area of the display panel.

14 Claims, 18 Drawing Sheets

FIG. 11

DISPLAY DEVICE AND PANEL BONDING SYSTEM COMPRISING THE SAME

CROSS-REFERENCE TO RELATED APPLICATION

This application claims priority under 35 U.S.C. 119 from Korean Patent Application No. 10-2022-0033595, filed on Mar. 17, 2022 in the Korean Intellectual Property Office, the contents of which are herein incorporated by reference in their entirety.

TECHNICAL FIELD

Embodiments of the present disclosure are directed to a display device and a panel bonding system that includes the same.

DISCUSSION OF THE RELATED ART

Recently, a three-dimensional (3D) image display device and a viewing-angle control display device have been developed that provide divided images in the space in front of the display device using an optical member.

A 3D image display device separately displays a left-eye image and a right-eye image to give a viewer 3D experiences using binocular parallax. 3D display technology is also called a stereoscopic technique, which may be divided into a glasses type stereoscopic technique and an auto-stereoscopic technique. A stereoscopic technique utilizes parallax images between left and right eyes, which provide large stereoscopic effects. The stereoscopic technique may be realized with glasses, and the auto-stereoscopic technique may be realized without glasses (glasses-free 3D). For the auto-stereoscopic technique (a stereoscopic technique with glasses), a left-eye image and a right-eye image that have different polarizations are displayed, so that a viewer with polarization glasses or shutter glasses can see 3D images.

For a glasses-free stereoscopic technique, an optical member such as a parallax barrier or a lenticular sheet is formed in the display device, and the optical axis of a left-eye image is separated from the optical axis of a right-eye image, so that a viewer can see 3D images. Such a 3D image display device can be fabricated using a bonding apparatus that bonds a display panel to an optical member.

SUMMARY

Embodiments of the present disclosure provide a display device that can increase the efficiency of aligning a display panel with an optical member by setting viewing point information of pixels after the display panel has been attached to the optical member, and a method of fabricating the same.

According to an embodiment of the disclosure, a display device includes a display panel that includes a plurality of sub-pixels in a display area, an optical member attached to the display panel and that includes stereoscopic lenses, and a display driver that receives information on relative positions of the sub-pixels for each stereoscopic lens of the optical member from an optical member bonding apparatus, and corrects image data based on the relative positions of the sub-pixels so that 3D images are displayed in the display area of the display panel.

In an embodiment, the optical member bonding apparatus comprises: an optical member bonding unit that bonds the optical member to the display panel; and an alignment detecting unit that sequentially detects coordinates of positions of the sub-pixels in the display area, slanted angles of the stereoscopic lenses, and coordinates of relative positions of the sub-pixels with respect to each of the stereoscopic lenses.

In an embodiment, the display driver calculates the viewing points of the sub-pixels according to the relative positions of the sub-pixels with respect to each of the stereoscopic lenses and designates a viewing point number for each sub-pixel, generates corrected image data by correcting a position and alignment of the image data in each of horizontal lines according to the coordinates of the positions of the sub-pixels and the viewing point numbers, and drives the display area so that 3D images according to the corrected image data are displayed.

In an embodiment, the alignment detecting unit comprises a position coordinate detector that detects coordinates of a position of each of the sub-pixels in the display area, a slanted angle detector that analyzes an image pattern displayed on the display panel and detects slanted angles of the stereoscopic lenses, and a pixel position detector that detects the coordinates of relative positions of the sub-pixels with respect to each of the stereoscopic lenses based on information on a width and a slanted angle of each of the stereoscopic lenses.

In an embodiment, the display driver comprises a viewpoint data generator that calculates a number of viewing points for the sub-pixels according to the relative positions of the sub-pixels, and designate a viewing point number for each sub-pixel according to the number of viewing points of the sub-pixels, an image data corrector that generates corrected image data by correcting a position and alignment of the image data in each horizontal line, and a main processor that generates data voltages that correspond to the corrected image data so that the 3D images are displayed in the display area.

In an embodiment, the viewpoint data generator calculates a target viewpoint for each of the sub-pixels by calculating values of relative positions of the sub-pixels and a number of viewing points for each of the stereoscopic lens, and designates a target viewpoint or a target viewpoint value for each of the sub-pixels as the viewing point.

In an embodiment, the viewpoint data generator calculates a target viewpoint for each of the sub-pixels by calculating values of relative positions of the sub-pixels and the number of viewing points for each stereoscopic lens, and renders the target viewpoint for each of the sub-pixels by adding or subtracting a viewpoint number according to a fractional part of the target viewpoint for each of the sub-pixels.

According to an embodiment of the disclosure, a panel bonding system includes a display device that displaying images, and a bonding apparatus that bonds an optical member to the display device. The bonding apparatus includes an optical member bonding unit that bonds the optical member to the display device, and an alignment detecting unit that sequentially detects coordinates of positions of a plurality of sub-pixels in a display area of the display device, slanted angles of stereoscopic lenses in the optical member, and coordinates of relative positions of the sub-pixels with respect to each of the stereoscopic lenses.

In an embodiment, the display device includes a display panel that includes the display area and the plurality of sub-pixels in the display area, the optical member attached to the display panel and that includes the stereoscopic lenses, and a display driver that receives information on relative positions of the sub-pixels for each of stereoscopic lenses of the optical member from the bonding apparatus, and that corrects image data based on the relative positions of the sub-pixels so that 3D images are displayed in a display area of the display panel.

In an embodiment, the optical member bonding unit aligns an alignment mark of the display panel with a flat portion of the optical member and attaches the optical member to a front surface or the display area of the display panel.

In an embodiment, the alignment detecting unit includes a position coordinate detector that detects coordinates of a position of each of the sub-pixels in the display area, a slanted angle detector that analyzes an image pattern displayed on the display panel and detects slanted angles of the stereoscopic lenses, and a pixel position detector that detects the coordinates of relative positions of the sub-pixels with respect to each of the stereoscopic lenses based on information about a width and a slanted angle of each of the stereoscopic lenses.

In an embodiment, the position coordinate detector designates a sub-pixel located at one of an upper left end, an upper right end, a lower left end, a lower right end, or a center of the display area as a reference pixel, and sequentially detects coordinates of positions of other sub-pixels based on the reference pixel.

In an embodiment, the display driver drives the display area of the display panel so that an image of a predetermined image pattern is displayed on the display area and receives position coordinate information for all of the sub-pixels from the position coordinate detector.

In an embodiment, the position coordinate detector detects distance values between the sub-pixels and the stereoscopic lenses using the positions of the sub-pixels arranged in first and second directions, sizes of the sub-pixels, and the coordinates of relative positions of the sub-pixels.

In an embodiment, the position coordinate detector calculates values of relative positions of the sub-pixels that overlap each of the stereoscopic lenses by using the distance values between the sub-pixels and the stereoscopic lenses and a remaining width of each of the stereoscopic lenses.

In an embodiment, the display driver calculates viewing points of the sub-pixels according to the relative positions of the sub-pixels with respect to each of the stereoscopic lenses and designates a viewing point number for each sub-pixel.

In an embodiment, the display driver generates corrected image data by correcting a position and alignment of the image data in each horizontal line according to the coordinates of the positions of the sub-pixels and the viewing point numbers and drives the display area so that 3D images according to the corrected image data is displayed.

In an embodiment, the display driver comprises a viewpoint data generator that calculates a number of viewing points for the sub-pixels according to the relative positions of the sub-pixels, and designates a viewing point number for each sub-pixel according to the number of viewing points of the sub-pixels, an image data corrector that generates corrected image data by correcting a position and alignment of the image data in each horizontal line, and a main processor that generates data voltages that correspond to the corrected image data wherein the 3D images are displayed in the display area.

In an embodiment, the viewpoint data generator calculates a target viewpoint for each of the sub-pixels by calculating values of relative positions of the sub-pixels and a number of viewing points for each of the stereoscopic lens, and designates a target viewpoint or a target viewpoint value for each of the sub-pixels as the viewing point.

In an embodiment, the viewpoint data generator calculates a target viewpoint for each of the sub-pixels by calculating values of relative positions of the sub-pixels and the number of viewing points for each of the stereoscopic lens, and renders the target viewpoint for each of the sub-pixels by adding or subtracting a viewpoint number according to fractional part of the target viewpoint for each of the sub-pixels.

According to an embodiment of the disclosure, a method of aligning a display panel with a flat portion of an optical member when attaching the optical member on a front surface of the display panel includes sequentially detecting position coordinates of sub-pixels in a display area of a display panel as an optical member is attached to a front surface of the display area; driving the display panel wherein image of a predetermined image pattern is displayed in the display area; analyzing a slanted angle of the predetermined image pattern and detecting the slanted angle of each stereoscopic lens of the optical member associated with a slanted angle of the predetermined image pattern; detecting coordinates of relative positions of the sub-pixels that overlap each of the stereoscopic lenses based on information about a width and the slanted angle of each of the stereoscopic lenses; generating a viewing point for each of the sub-pixels according to relative positions of the sub-pixels with respect to each of the stereoscopic lenses, and designating a viewing point number for each of the sub-pixels according to the viewing point; and generating data voltages that correspond to the corrected image data and supplying the data voltages to the data lines, wherein images are displayed according to the relative positions of the sub-pixels with respect to the stereoscopic lenses.

According to the embodiment of the present disclosure, a display panel and an optical member of a display device are attached together, and viewing point information for sub-pixels is set according to the alignment of the sub-pixels and the optical member, to display 3D images. For example, since the viewing point information of the sub-pixels is set after the display panel and the optical member have been attached together, it is possible to reduce the time taken to attach the display panel to the optical member, and to reduce fabrication costs. In this manner, the efficiency of attaching the display panel to the optical member can be increased.

BRIEF DESCRIPTION OF THE DRAWINGS

FIG. 11 illustrates a method of setting viewing point information on each of sub-pixels according to the slanted angle of the optical member and the lens width, according to an embodiment of the present disclosure.

DETAILED DESCRIPTION

Embodiments of the present disclosure will now be described more fully hereinafter with reference to the accompanying drawings, in which embodiments of the disclosure are shown.

It will also be understood that when a layer is referred to as being "on" another layer or substrate, it can be directly on the other layer or substrate, or intervening layers may also be present. The same reference numbers may indicate the same components throughout the specification.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments of the present disclosure will be described with reference to the accompanying drawings.

Figure 1:
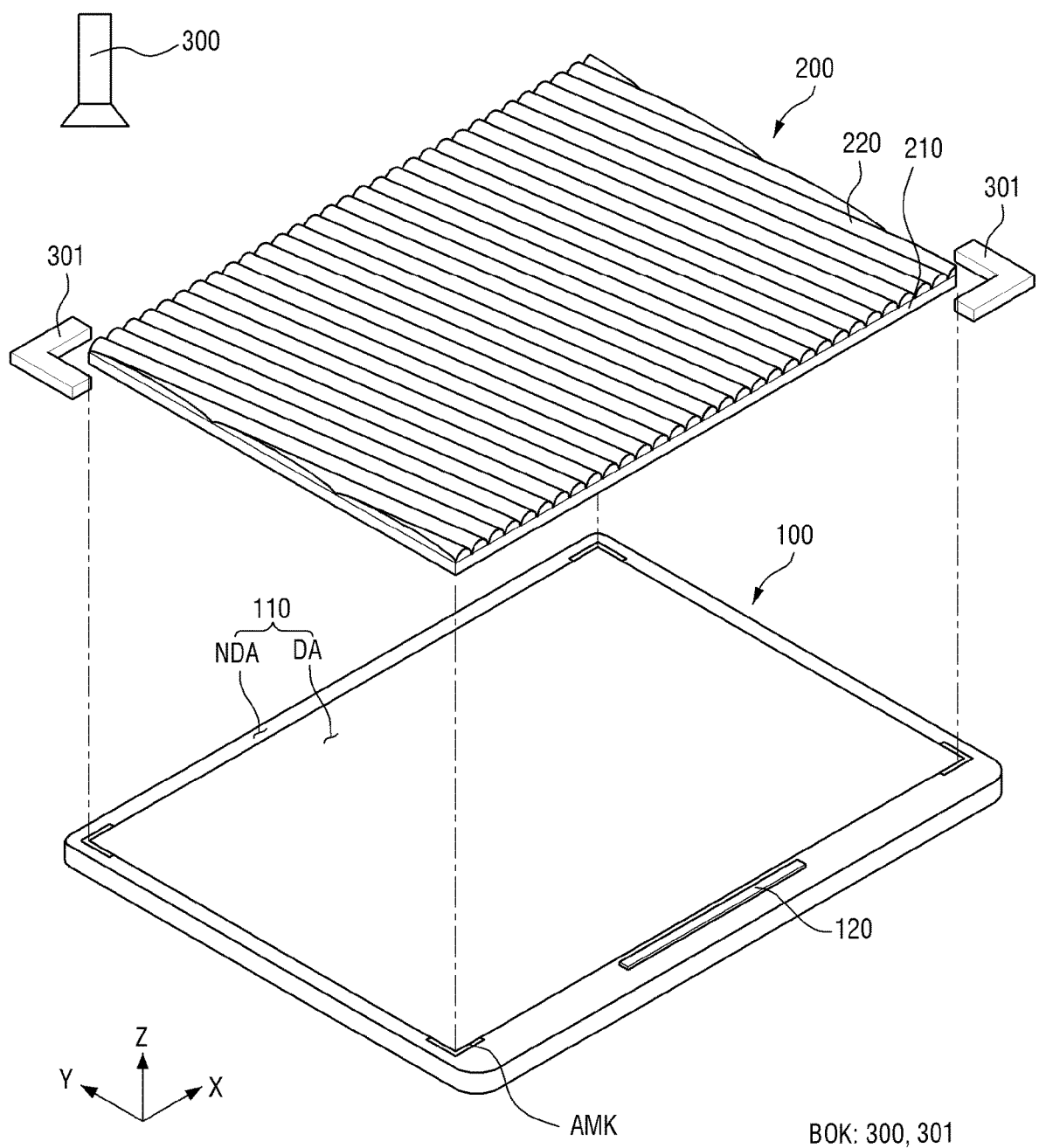
FIG. 1 is an exploded, perspective view of a display device according to an embodiment of the present disclosure.
Figure 2:
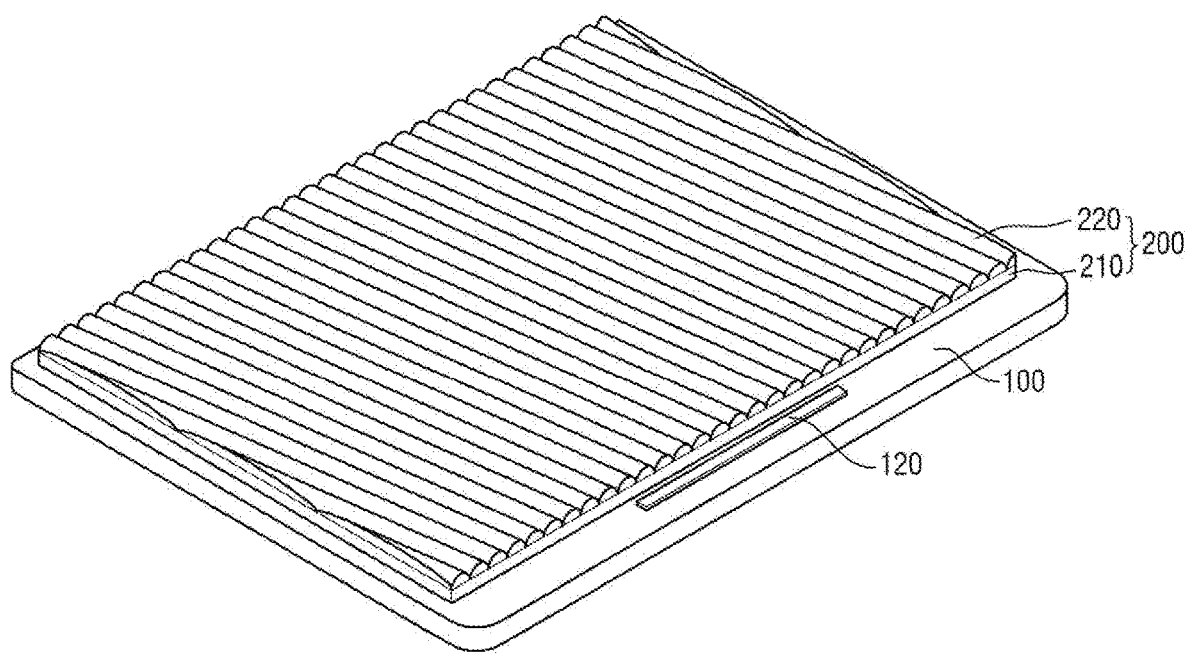
FIG. 2 illustrates a display panel and an optical member shown in FIG. 1 when they are attached together.

FIG. 1 is an exploded, perspective view of a display device according to an embodiment of the present disclosure. FIG. 2 illustrates a display module and an optical member shown in FIG. 1 when they are attached together.

Referring to FIGS. 1 and 2, in an embodiment, a display device is implemented as a flat panel display device such as a liquid-crystal display (LCD) device, a field emission display (FED) device, a plasma display panel (PDP) device, or an organic light-emitting display (OLED) device.

The display device is a 3D image display device that includes a display module 100 and an optical member 200. The optical member 200 includes a flat portion 210 and stereoscopic lenses 220 that are slanted at an oblique angle with respect to a side of the optical member 200. The 3D image display device separately displays a left-eye image and a right-eye image on the front side of the display device to give a viewer 3D experiences by utilizing binocular parallax. Furthermore, the 3D image display device separately provides images at different viewing angles on the front side of the display device so that different images are displayed at the different viewing angles.

The 3D image display device is a light-field display device that allows different image information to be seen by a viewers' eyes, respectively, by disposing the optical member 200 on the front side of the display module 100. A light-field display device generates a 3D image by generating a light field with the display module 100 and the 3D optical member 200. As will be described below, light emitted by each of the pixels of the display module 100 of the light-field display device form a light field directed to a particular direction, such as a particular viewing angle and/or a particular viewpoint, by stereoscopic lenses, pinholes or barriers. In this manner, 3D image information associated with a particular direction can be provided to a viewer.

The display module 100 includes a display panel 110, a display driver 120, and a circuit board.

The display panel 110 includes a display area DA and a non-display areas NDA. The display area DA includes data lines, scan lines, supply voltage lines, and a plurality of pixels connected to the data lines and scan lines. For example, the scan lines extend in a first direction (x-axis direction) and are spaced apart from one another in a second direction (y-axis direction) that crosses the first (X) direction. The data lines and the supply voltage lines extend in the second (Y) direction and are spaced from one another in the first (X) direction.

Each of the pixels is connected to at least one scan line, data line, and supply voltage line. Each of the pixels includes thin-film transistors that include a driving transistor and at least one switching transistor, a light-emitting element, and a capacitor. When a scan signal is received from a scan line, each of the pixels receives a data voltage from a data line and supplies a driving current to the light-emitting element according to the data voltage applied to the gate electrode, so that light can be emitted.

The non-display area NDA is disposed at the edge of the display panel 110 and surrounds the display area DA. The non-display area NDA includes a scan driver that transmits scan signals to scan lines, and pads connected to the display driver 120. For example, the display driver 120 is disposed on one side of the non-display area NDA, and the pads are disposed on one edge of the non-display area NDA on which the display driver 120 is disposed.

At least one alignment mark AMK is located outside the display area DA of the display panel 110, i.e., in the non-display area NDA. Accordingly, an optical member bonding apparatus BOK of a panel bonding system aligns the alignment mark AMK with the flat portion 210 of the optical member 200 to increase the alignment precision of the optical member 200.

The optical member bonding apparatus BOK includes an optical member bonding unit 301 that bonds the optical member 200 on the display panel 110, and an alignment detecting unit 300 that calculates information on relative positions of the sub-pixels for each of the stereoscopic lenses 220.

The alignment detecting unit 300 of the panel bonding system detects the coordinates of the pixels, such as sub-pixels of the display area DA, as the optical member 200 is attached to the front surface of the display area DA. In addition, the alignment detecting unit 300 detects the slanted angle of the stereoscopic lenses 220 of the optical member 200, and detects the relative positions of the sub-pixels with respect to the stereoscopic lenses 220 based on information about the width and slanted angle of each of the stereoscopic lenses 220. The alignment detecting unit 300 transmits the information about the relative positions of the sub-pixels with respect to the stereoscopic lenses 220 to the display driver 120 of the display module 100.

The display driver 120 outputs signals and voltages that drive the display panel 110. The display driver 120 supplies data voltages to data lines. The display driver 120 supplies supply voltages to the supply voltage line, and supplies scan control signals to the scan driver. The display driver 120 is implemented as an integrated circuit (IC) and is disposed in the non-display area NDA of the display panel 110 by one of a chip on glass (COG) technique, a chip on plastic (COP) technique, or an ultrasonic bonding technique. Alternatively, the display driver 120 is mounted on a circuit board and connected to the pads of the display panel 110.

The display driver 120 receives the information about the relative positions of the sub-pixels with respect to each of the stereoscopic lenses 220 from the alignment detecting unit 300 of the optical member bonding apparatus BOK. The display driver 120 calculates viewing points for the sub-pixels based on the relative positions of the sub-pixels with respect to each of the stereoscopic lenses 220, and designates a viewing point number according to the viewing point of each of the sub-pixels. In addition, the display driver 120 generates corrected image data by correcting the positions and alignment of image data received from an external source in each of horizontal lines based on the coordinates of the positions and viewing point numbers of the sub-pixels. Accordingly, the display driver 120 generates data voltages that correspond to the corrected image data and supplies the data voltages to the data lines, so that images can be displayed according to the relative positions of the sub-pixels with respect to the stereoscopic lenses 220.

The optical member 200 is disposed on the display module 100. The optical member 200 is attached to one surface of the display module 100 through an adhesive member. The optical member 200 is attached to the display module 100 by the panel bonding system. For example, the optical member 200 is implemented as a lenticular lens sheet that includes the stereoscopic lenses 220. For another example, the stereoscopic lenses 220 is implemented as liquid-crystal lenses that are formed by controlling liquid crystals of a liquid-crystal layer. When the stereoscopic lenses 220 are implemented as a lenticular lens sheet, the stereoscopic lenses 220 may be disposed on the flat portion 210.

The flat portion 210 is disposed directly on the upper surface of the display module 100. For example, one surface of the flat portion 210 that faces the display module 100 and an opposite surface of the flat portion 210 opposed to the one surface of the flat portion 210 are parallel to each other. The flat portion 210 outputs the light received from the display module 100 as is. The direction of light passing through the surface of the flat portion 210 is coincident with the direction of light passing through the opposite surface of the flat portion 210. The flat portion 210 is integrally formed with the stereoscopic lenses 220, but embodiments of the present disclosure are not necessarily limited thereto.

The stereoscopic lenses 220 are disposed on the flat portion 210 and change directions of light received from the display module 100. Light received from the display module 100 passes through the flat portion 210 to reach the stereoscopic lenses 220. The stereoscopic lenses 220 are inclined at a predetermined angle from one side of the display module 100. For example, the stereoscopic lenses 220 are slanted lenses inclined by a predetermined angle from the side of each of the plurality of pixels of the display panel 110. The predetermined angle is determined to prevent color lines of the display device from being perceived by a viewer.

The stereoscopic lenses 220 is integrally formed with the flat portion 210. For example, the flat portion 210 is embossed on it's upper surface to form the lenses. In an embodiment, the stereoscopic lenses 220 are, but are not necessarily limited to, half-cylindrical lenses. For example, in some embodiments, the stereoscopic lenses 220 are implemented as Fresnel Lenses. For example, in some embodiments, the stereoscopic lenses 220 are fabricated separately from the flat portion 210 and then attached to the flat portion 210.

Figure 3:
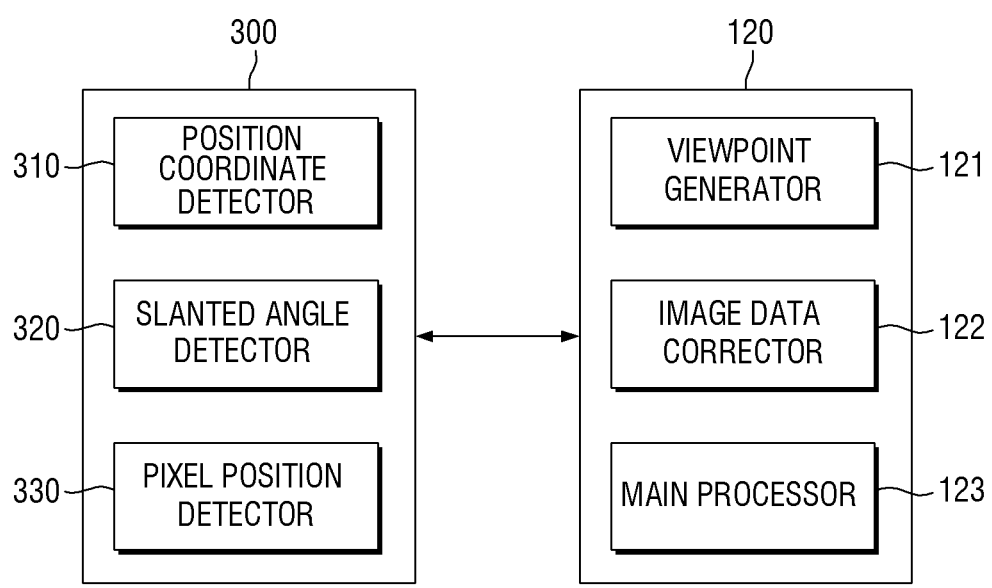
FIG. 3 is a block diagram of a display driver and a panel bonding system that includes an alignment detecting unit according to an embodiment.

FIG. 3 is a block diagram of a display driver and a panel bonding system including an alignment detecting unit according to an embodiment.

Referring to FIG. 3, in an embodiment, the bonding apparatus includes the alignment detecting unit (a detecting circuit) 300 that sequentially detects information about position coordinates of the sub-pixels disposed on the display panel 110, a slanted angle of the stereoscopic lenses 220 of the optical member 200, and information about the relative positions of the sub-pixels with respect to each of the stereoscopic lenses 220.

The alignment detecting unit 300 includes a position coordinate detector (a detector circuit) 310, a slanted-angle detector (a detector circuit) 320, and a pixel position detector (a detector circuit) 330.

Specifically, the position coordinate detector 310 detects the coordinates of the position of each of the sub-pixels arranged in the display area DA as the optical member 200 is attached to the front surface of the display panel 110.

The slanted-angle detector 320 analyzes an image pattern displayed on the display panel 110 to detect the slanted angle of the stereoscopic lenses 220 of the optical member 200.

The pixel position detector 330 detects the coordinates of the relative positions of the sub-pixels with respect to each of the stereoscopic lenses 220 based on the information about the width and slanted angle of each of the stereoscopic lenses 220. The pixel position detector 330 transmits the information about the detected coordinates of the relative positions of the sub-pixels to the display driver 120 of the display module 100.

The display driver 120 of the display module 100 designates the viewing point and the viewing point number of each of the sub-pixels based on the coordinates of the relative positions of the sub-pixels with respect to each of the stereoscopic lenses 220. The display driver 120 corrects image data according to the position coordinates and the viewing point number of each of the sub-pixels, and controls each of the sub-pixels so that an image based on the corrected image data is displayed on the display panel 110.

The display driver 120 includes a viewpoint data generator 121, an image data corrector 122, and a main processor 123.

The viewpoint data generator 121 calculates the number of viewing points of each of the sub-pixels based on the relative positions of the sub-pixels with respect to the stereoscopic lenses 220, and designates the viewing point number according to the number of viewing points of each of the sub-pixels.

The image data corrector 122 generates corrected image data by correcting the positions of image data received from an external source in each of the horizontal lines and the alignment according to the positions and the viewing point number of each of the sub-pixels to.

The main processor 123 generates data voltages that correspond to the corrected image data and supplies the data voltages to the data lines, so that images can be displayed according to the relative positions of the sub-pixels with respect to the stereoscopic lenses 220.

Figure 4:
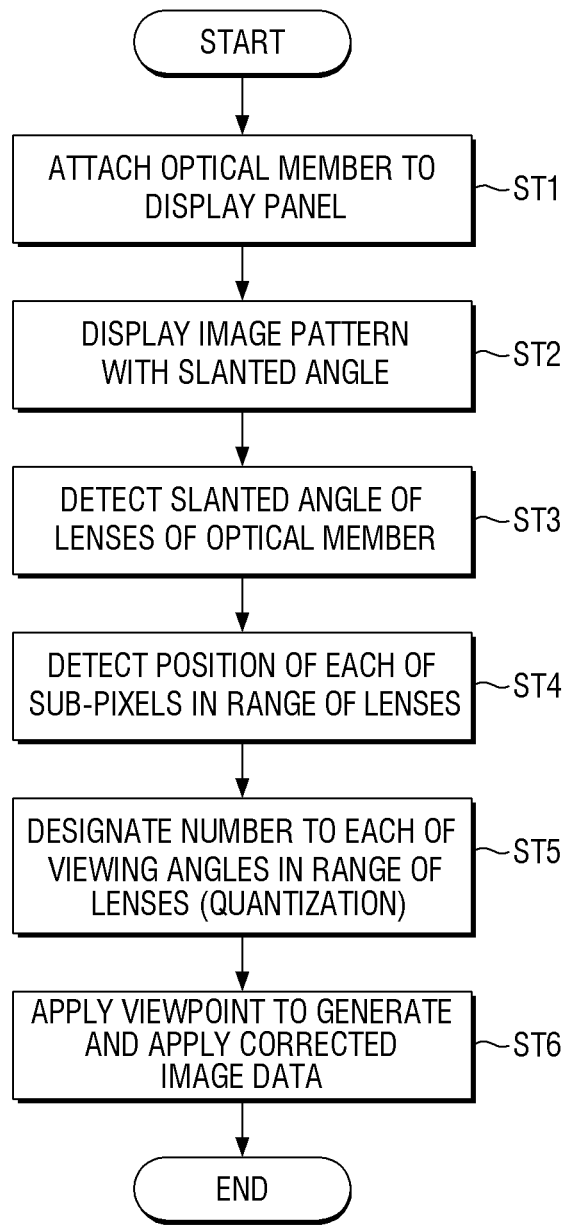
FIG. 4 is a flowchart of a method for setting viewing point information of the sub-pixels according to an embodiment of the present disclosure.

FIG. 4 is a flowchart of a method for setting viewing point information of the sub-pixels according to an embodiment of the present disclosure.

Referring to FIG. 4, in an embodiment, the bonding apparatus of the bonding system aligns the alignment mark of the display panel 110 with the flat portion 210 of the optical member 200 to attach the optical member 200 on the front surface of the display panel 110 or the display area DA.

The position coordinate detector 310 of the alignment detecting unit 300 detects the coordinates of the position of each of the sub-pixels arranged in the display area DA as the optical member 200 is attached to the front surface of the display panel 110 or the display area DA. The steps of FIG. 4 will be described in detail below.

Figure 5:
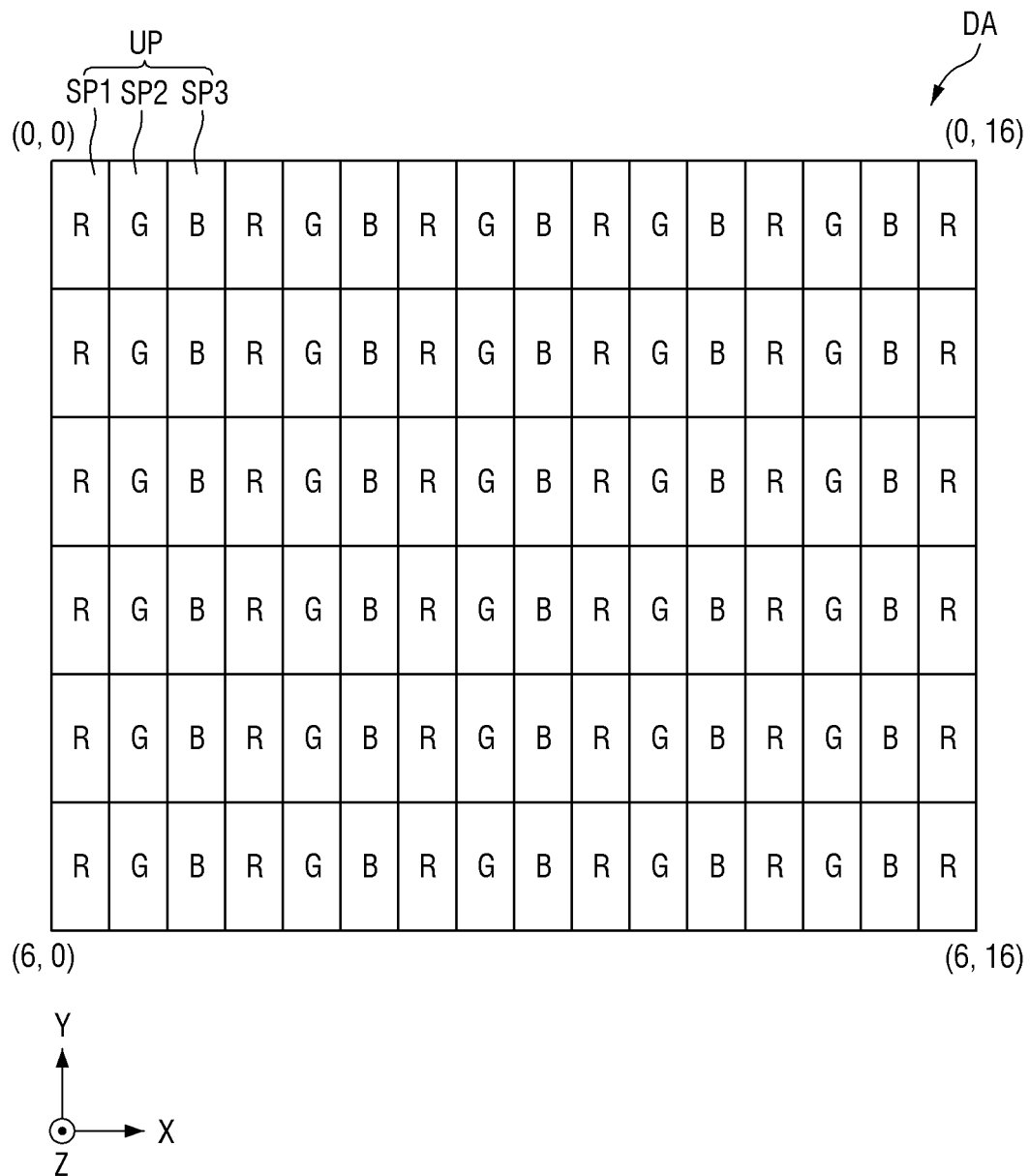
FIG. 5 is a plan view of an arrangement structure of sub-pixels of the display area, according to an embodiment of the present disclosure.

FIG. 5 is a plan view of an arrangement structure of sub-pixels of the display area, according to an embodiment of the present disclosure.

Referring to FIG. 5, in an embodiment, a plurality of unit pixels UP is disposed and formed in the display area DA of the display panel 110, and each of the unit pixels UP includes a plurality of sub-pixels SP1, SP2 and SP3. The sub-pixels SP1, SP2 and SP3 are arranged in a plurality of rows and a plurality of columns. For example, the sub-pixels SP1, SP2 and SP3 are arranged and formed in a vertical or horizontal stripe structure. The display area DA of the display panel 110 includes more unit pixels UP as the resolution of the display device increases.

For example, each of the unit pixels UP includes first to third sub-pixels SP1 SP2 and SP3 that respectively display different colors. The first to third sub-pixels SP1 SP2 and SP3 are formed where n data lines and m scan lines intersect each other, where n and mm are positive integers. Each of the plurality of sub-pixels SP1 SP2 and SP3 includes a light-emitting element and a pixel circuit. The pixel circuit includes a driving transistor, at least one switching transistor and at least one capacitor that drive the light-emitting element of each of the plurality of sub-pixels.

Each of the plurality of unit pixels UP includes, but is not necessarily limited to, one first sub-pixel SP1, two second sub-pixels SP2, and one third sub-pixel SP3. In an embodiment, the first sub-pixel SP1 is a red sub-pixel, the second sub-pixel SP2 is a green sub-pixel, and the third sub-pixel SP3 is a blue sub-pixel. Each of the first to third sub-pixels SP1 SP2 and SP3 receives a data signal that includes luminance information for red, green or blue light from the display driver 120 and outputs light of the respective color.

The position coordinate detector 310 sequentially detects the position coordinates of all of the sub-pixels SP1, SP2 and SP3 in the display area DA as the optical member 200 is attached to the front surface of the display area DA (step ST1 of FIG. 4).

For example, the position coordinate detector 310 sets a first sub-pixel of a first unit pixel disposed at the upper left end as a reference pixel, and sets the position coordinates (x,y) of the first sub-pixel of the first unit pixel to (0.0). Then, the position coordinates (x,y) of all of the sub-pixels SP1, SP2 and SP3 in the display area DA can be sequentially detected up to the last sub-pixel with respect to the first sub-pixel of the first unit pixel, which is the reference pixel. In doing so, the position coordinate detector 310 sets a sub-pixel disposed at one of the upper-left end, the upper-right end, the lower-left end, the lower-right end, or the center of the display area DA as a reference pixel, and sequentially detects the position coordinates (x,y) for the other sub-pixels. For example, in FIG. 5, taking the sub-pixel at the upper-left end as the reference pixel, the sub-pixel at the upper right end has position coordinates (0, 16), the sub-pixel at the lower left end has position coordinates (6,0), and the sub-pixel at the lower right end has position coordinates (6, 16). The pixel position detector 310 transmits the information about the position coordinates of all of the sub-pixels to the display driver 120 of the display module 100.

Figure 6:
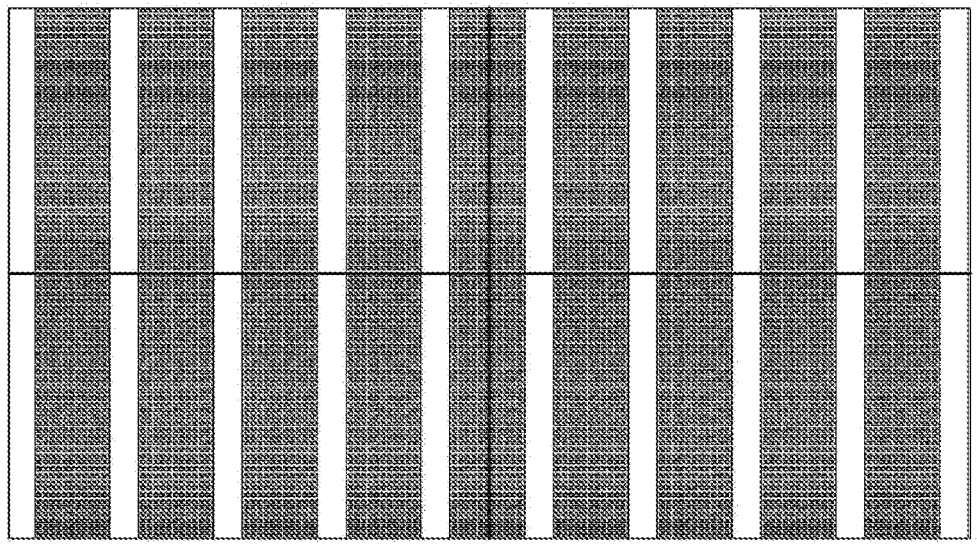
FIG. 6 illustrates an image pattern displayed in a display area that detects a slanted angle of an optical member, according to an embodiment of the present disclosure.
Figure 7:
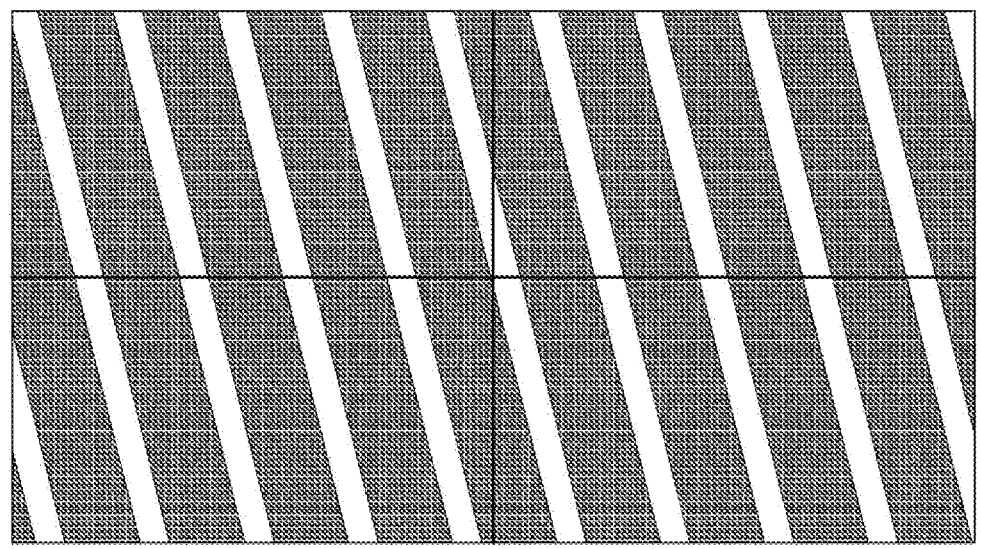
FIG. 7 illustrates another image pattern displayed in the display area that detects a slanted angle of an optical member, according to an embodiment of the present disclosure.

FIG. 6 shows an image pattern displayed in the display area that detects the slanted angle of the optical member, according to an embodiment of the present disclosure. FIG. 7 shows another image pattern displayed in the display area that detects the slanted angle of the optical member, according to an embodiment of the present disclosure.

Referring to FIGS. 6 and 7, in an embodiment, when position coordinate information of all of the sub-pixels SP1, SP2 and SP3 is received from the position coordinate detector 310, the display driver 120 of the display module 100 drives the display panel 110 so that the image of a predetermined image pattern is displayed in the display area DA (step ST2 of FIG. 4).

As shown in FIGS. 6 and 7, the pattern image displayed in the display area DA is slanted at an angle at which the stereoscopic lenses 220 of the optical member 200 are slanted.

Figure 8:
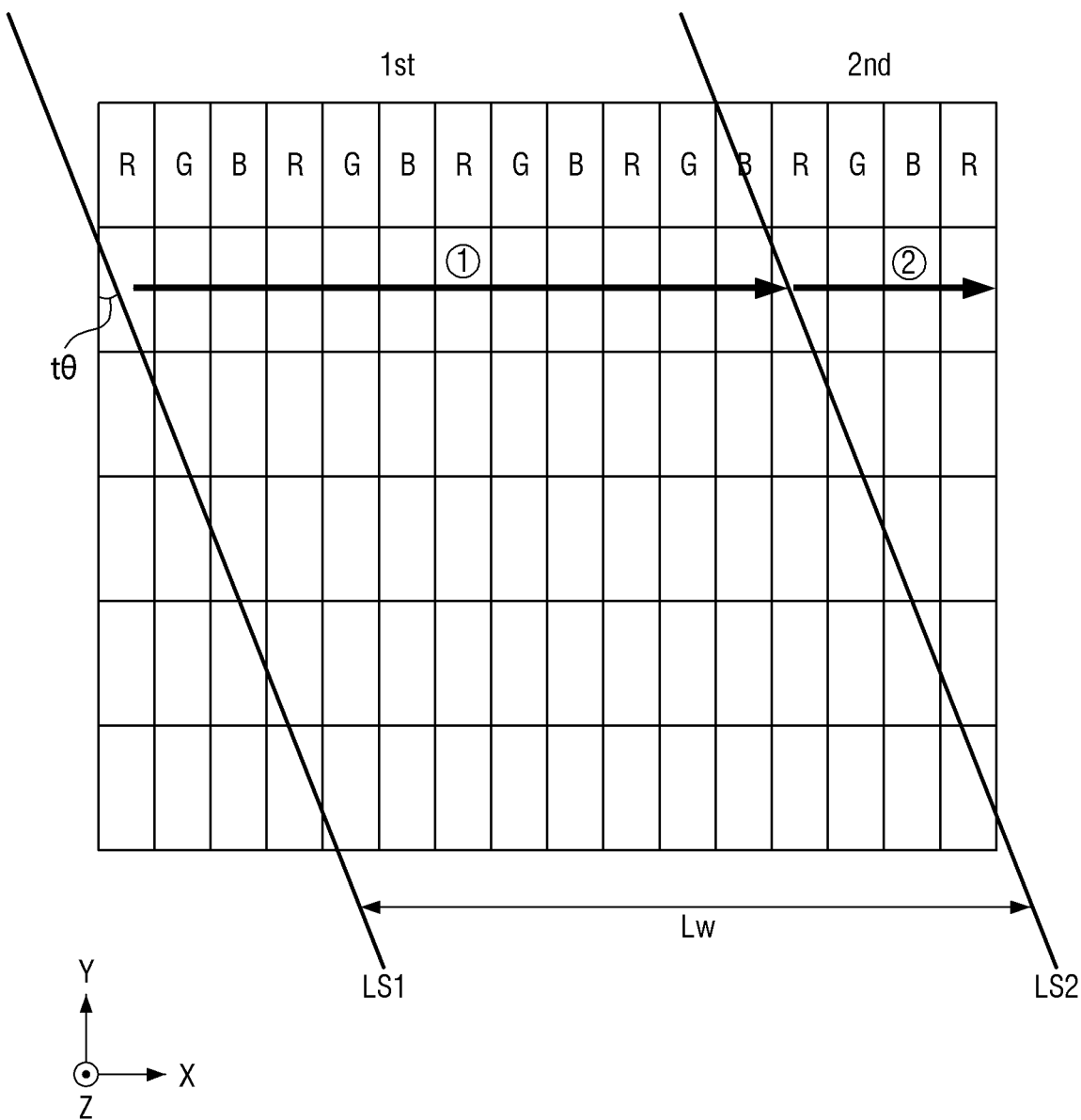
FIG. 8 illustrates a method of setting position information on each of sub-pixels according to the slanted angle of the optical member and the lens width, according to an embodiment of the present disclosure.

FIG. 8 illustrates a method of setting position information for each of sub-pixels according to the slanted angle of the optical member and the lens width, according to an embodiment of the present disclosure.

Referring to FIG. 8, in an embodiment, the slanted-angle detector 320 analyzes the slanted angle $t\theta$ of the image pattern displayed on the display panel 110, and detects the slanted angle of each of the stereoscopic lenses LS1 and LS2, associated with the slanted angle of the image pattern (step ST3 of FIG. 4). For example, the stereoscopic lenses LS1 and LS2 are two of the stereoscopic lenses 220 that are continuously disposed.

The pixel position detector 330 calculates the width Lw of each of the stereoscopic lenses LS1 and LS2 based on the information about the slanted angle $t\theta$ of each of the stereoscopic lenses LS1 and LS2 and the pattern image. The width Lw of each of the stereoscopic lenses 220 is predetermined.

The pixel position detector 330 detects the coordinates of the relative positions of the sub-pixels SP1, SP2 and SP3 that overlap each of the stereoscopic lenses LS1 and LS2 based on the information about the width Lw and the slanted angle $t\theta$ of each of the stereoscopic lenses LS1 and LS2 (step ST4 of FIG. 4).

The coordinates of the relative positions of the sub-pixels SP1, SP2, and SP3 that overlap each of the stereoscopic lenses LS1 and LS2 are repeatedly detected in the width or first (X) direction of each of the stereoscopic lenses LS1 and LS2. This is expressed in Equation 1 below:

relative position coordinates=row×pixel size×tan (slanted angle)  Equation 1:

where the row denotes the horizontal line number, the pixel size denotes the width or size of each sub-pixel, and the tan (slanted angle) denotes the slanted angle tθ.

Once the coordinates of the positions of the sub-pixels that are repeatedly arranged in the first (X) direction in the first horizontal line have been detected, the coordinates of the relative positions of the sub-pixels SP1, SP2 and SP3 arranged in the first (X) direction in another horizontal line are sequentially detected. By repeating the process of detecting the coordinates of the relative positions of the sub-pixels arranged in all of the horizontal lines, the coordinates of the positions of all of the sub-pixels SP1, SP2 and SP3 in the display area DA can be detected.

The pixel position detector 330 detects the distance between the sub-pixels and the stereoscopic lenses by using the positions of the sub-pixels in the second (Y) direction, the size of each of the sub-pixels and the coordinates of the relative positions of the sub-pixels, as expressed in Equation 2 below:

distance between sub-pixels and stereoscopic lenses= (cols×pixel size)−relative positions coordinates  Equation 2:

where the cols denotes sub-pixel position information in the second (Y) direction, the pixel size denotes the width or size of each sub-pixel, and the relative positions coordinates of sub-pixels are obtained from Equation 1 above.

The pixel position detector 330 calculates the values of the relative positions of the sub-pixels SP1, SP2 and SP3 that overlap each of the stereoscopic lenses LS1 and LS2 by using the distance values between the sub-pixels SP1, SP2 and SP3 and the stereoscopic lenses LS1 and LS2 and the remaining width of the stereoscopic lenses, as expressed in Equation 3 below:

sub-pixels relative positions values=distance values between sub-pixels and stereoscopic lenses/ remaining width of stereoscopic lenses  Equation 3:

The pixel position detector 330 transmits the values of the relative positions of the sub-pixels SP1, SP2 and SP3 with respect to each of the stereoscopic lenses LS1 and LS2 to the display driver 120 of the display module 100.

Figure 9:
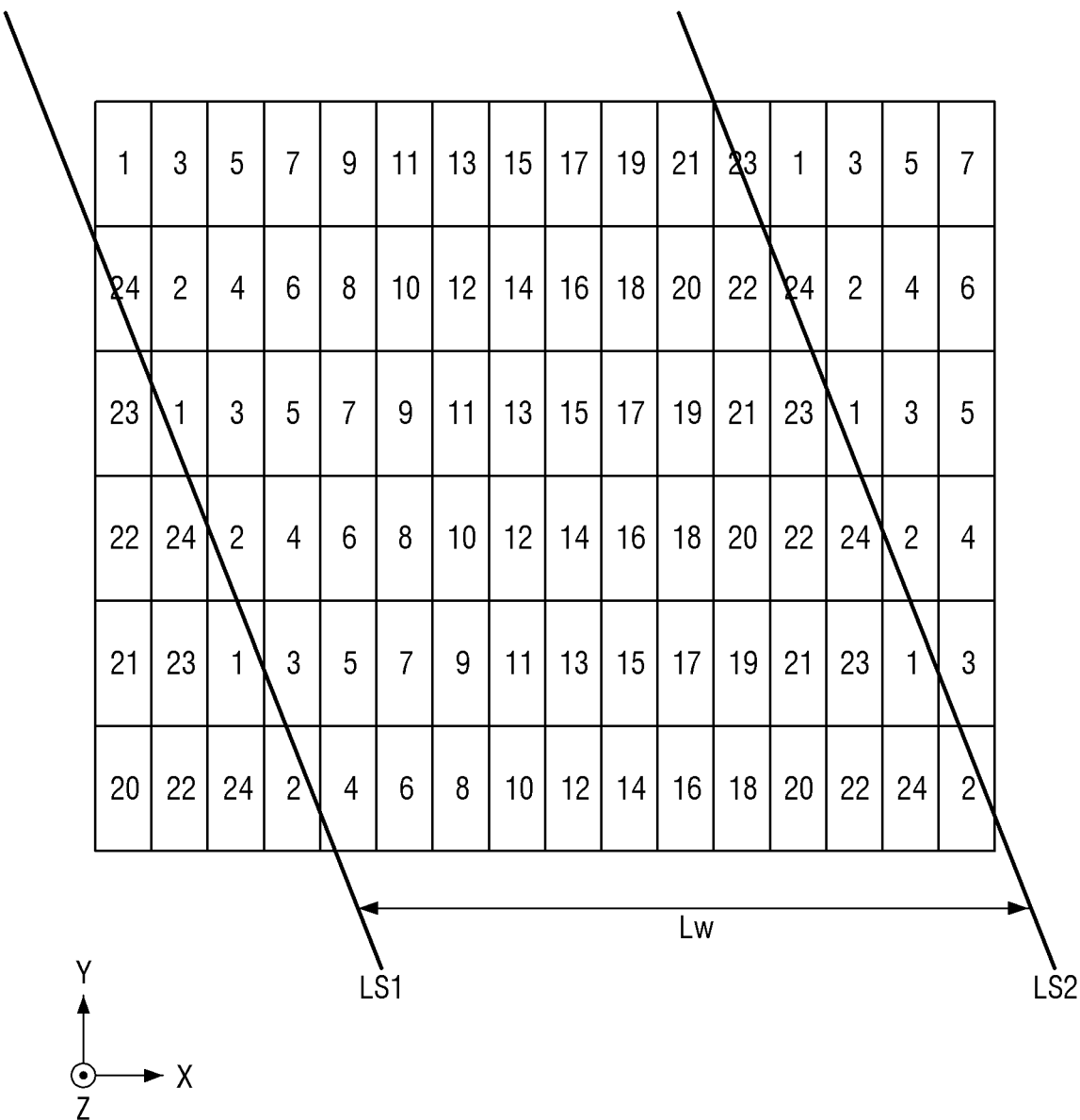
FIG. 9 illustrates a method of setting viewing point information on each of sub-pixels according to the slanted angle of the optical member and the lens width, according to an embodiment of the present disclosure.
Figure 10:
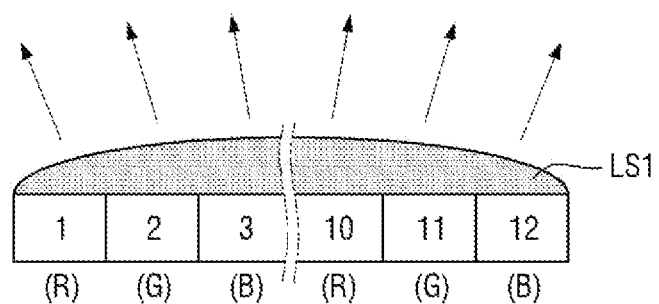
FIG. 10 illustrates a method of setting viewing point information on each of sub-pixels according to the lens width and the curvature, according to an embodiment of the present disclosure.

FIG. 9 illustrates a method of setting viewing point information on each of sub-pixels according to the slanted angle of the optical member and the lens width, according to an embodiment of the present disclosure. FIG. 10 illustrates a method of setting viewing point information on each of sub-pixels according to the lens width and the curvature, according to an embodiment of the present disclosure.

Referring to FIGS. 9 and 10, in an embodiment, the viewpoint data generator 121 generates a viewing point for each of the sub-pixels SP1, SP2 and SP3 according to the relative positions of the sub-pixels SP1, SP2 and SP3 with respect to each of the stereoscopic lenses LS1 and LS2, and designates a viewing point number for each of the sub-pixels SP1, SP2 and SP3 according to the viewing point (step ST5).

The viewpoint data generator 121 calculates the values of the relative positions of the sub-pixels and the number of viewing points for each of the stereoscopic lens LS1 and LS2, to obtain a target viewpoint for each of the sub-pixels SP1, SP2 and SP3, as expressed in Equation 4 below:

target viewpoints for the sub-pixels SP1,SP2 and SP3=sub-pixels relative positions values×number of viewing points  Equation 4:

By multiplying the relative position value of each of the sub-pixel by the number of viewing points for each of the stereoscopic lens LS1 and LS2, the target viewpoint, or target viewpoint value, for each of the sub-pixels SP1, SP2 and SP3 is calculated as a number that has a decimal point. The viewpoint data generator 121 designates the target viewpoint or the target viewpoint value for each of the sub-pixels SP1, SP2 and SP3 as the viewing point, discarding the fractional part of the number.

Alternatively, the viewpoint data generator 121 adds or subtracts a viewpoint number according to the fractional part of the target viewpoint for each of the pixels SP1, SP2 and SP3 to render the target viewpoint for each of the sub-pixels SP1, SP2 and SP3 to correct the target viewpoint for each of the sub-pixels SP1, SP2 and SP3.

The image data corrector 122 generates corrected image data by correcting the positions of image data received from an external source in each of the horizontal lines and the alignment according to the positions and the viewing point number of each of the sub-pixels. The main processor 123 generates data voltages that correspond to the corrected image data and supplies the data voltages to the data lines, so that images can be displayed according to the relative positions of the sub-pixels with respect to the stereoscopic lenses 220 (step ST6 of FIG. 4).

Figure 11:
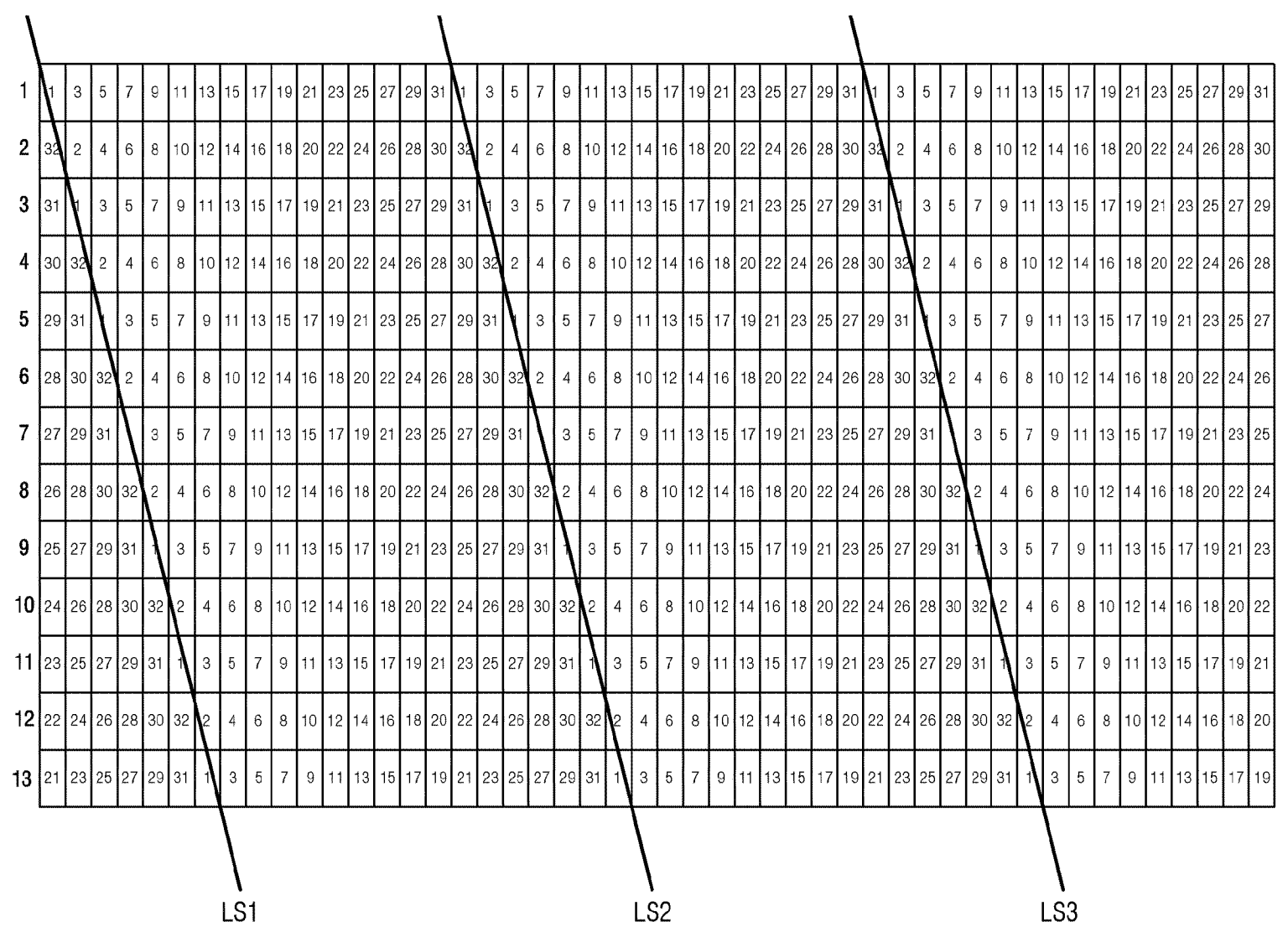

FIG. 11 illustrates another method of setting viewing point information on each of sub-pixels according to the slanted angle of the optical member and the lens width, according to an embodiment of the present disclosure.

As shown in FIG. 11, in an embodiment, the pixel position detector 330 detects the relative positions coordinates of the sub-pixels SP1, SP2 and SP3 that overlap each of the stereoscopic lenses LS1, LS2 and LS3 based on the information about the width Lw and the slanted angle tθ of each of the stereoscopic lenses LS1, LS2 and LS3. For example, the stereoscopic lenses LS1. LS2 and LS3 are three of the stereoscopic lenses 220 that are continuously disposed. Accordingly, the pixel position detector 330 calculates the relative positions values of the sub-pixels SP1. SP2 and SP3 that overlap each of the stereoscopic lenses LS1, LS2 and LS3 by using the distance values between the sub-pixels SP1, SP2 and SP3 and the stereoscopic lenses LS1 and LS2 and the remaining width of the stereoscopic lenses.

As shown in FIG. 11, the viewpoint data generator 121 calculates the relative positions values of the sub-pixels and the number of viewing points for each of the stereoscopic lens LS1, LS2 and LS3, to calculate the target viewpoint for each of the sub-pixels SP1, SP2 and SP3. For example, the number of viewing points for each stereoscopic lens LS1, LS2 and LS3 is calculated from the width Lw and the slanted angle tθ of each stereoscopic lens LS1, LS2 and LS3, so that the target viewpoint for each of the sub-pixels SP1, SP2 and SP3 can be calculated.

Figure 12:
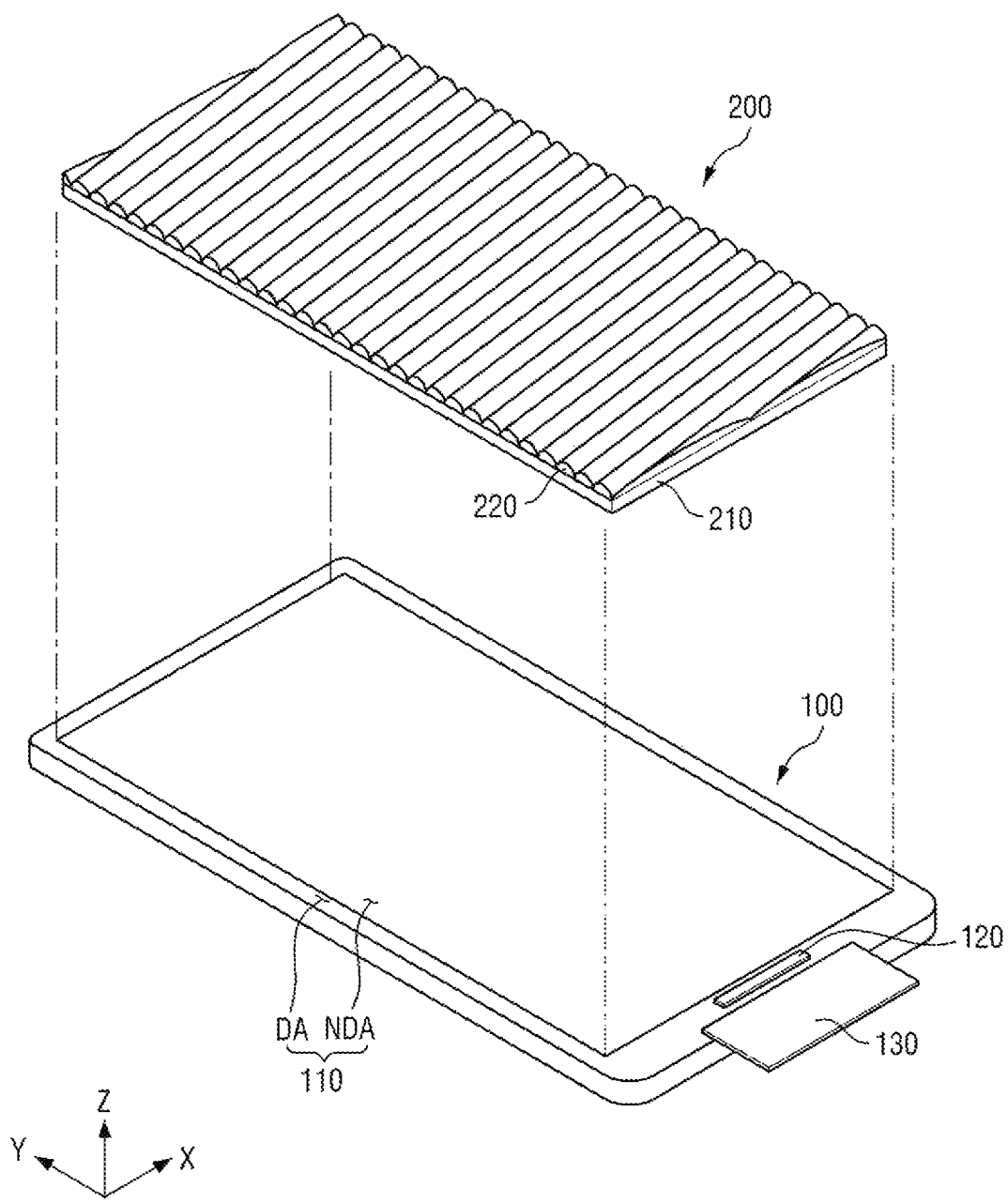
FIG. 12 is an exploded, perspective view of a display device according to an embodiment of the present disclosure.
Figure 13:
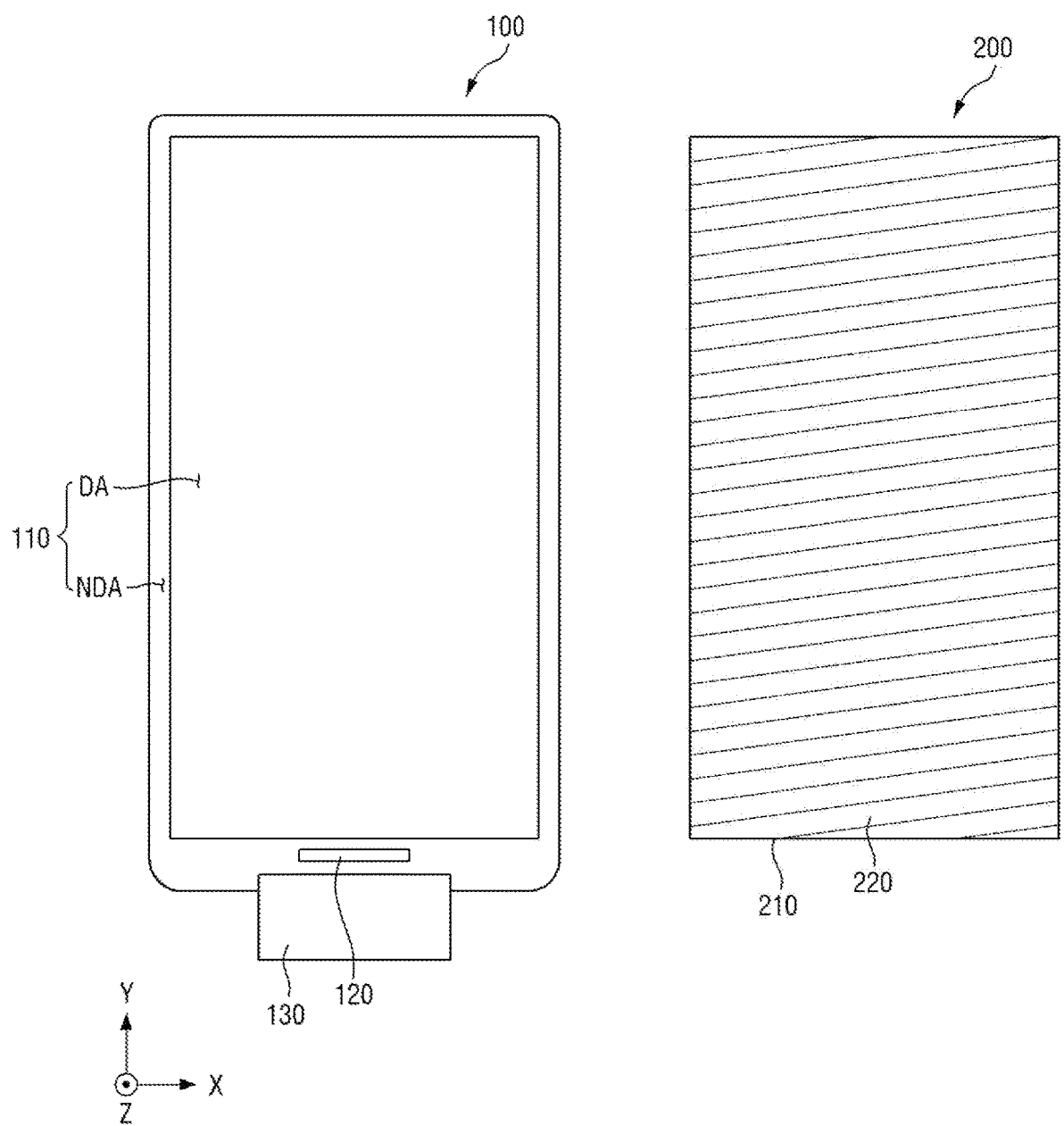
FIG. 13 is a plan view of a display panel and an optical member shown in FIG. 12.

FIG. 12 is an exploded, perspective view of a display device according to an embodiment of the present disclosure. FIG. 13 is a plan view of a display panel and an optical member shown in FIG. 12.

Referring to FIGS. 12 and 13, in an embodiment, the display device is a flat panel display device such as an organic light-emitting display (OLED), and is a 3D display that includes the display module 100 and the optical member 200.

The display module 100 includes a display panel 110, a display driver 120, and a circuit board 130. The optical member 200 includes a flat portion 210 and stereoscopic lenses 220 that are slanted at an oblique angle with respect to a side of the optical member 200.

The display panel 110 includes a display area DA and a non-display area NDA. The display area DA includes data lines, scan lines, supply voltage lines, and a plurality of pixels connected to the data lines and scan lines.

The optical member 200 is disposed on the display module 100. The optical member 200 is attached to one surface of the display module 100 by an adhesive member. The optical member 200 is attached to the display module 100 by a panel bonding apparatus. For example, the optical member 200 is a lenticular lens sheet that includes the flat portion 210 and a plurality of stereoscopic lenses 220.

Figure 14:
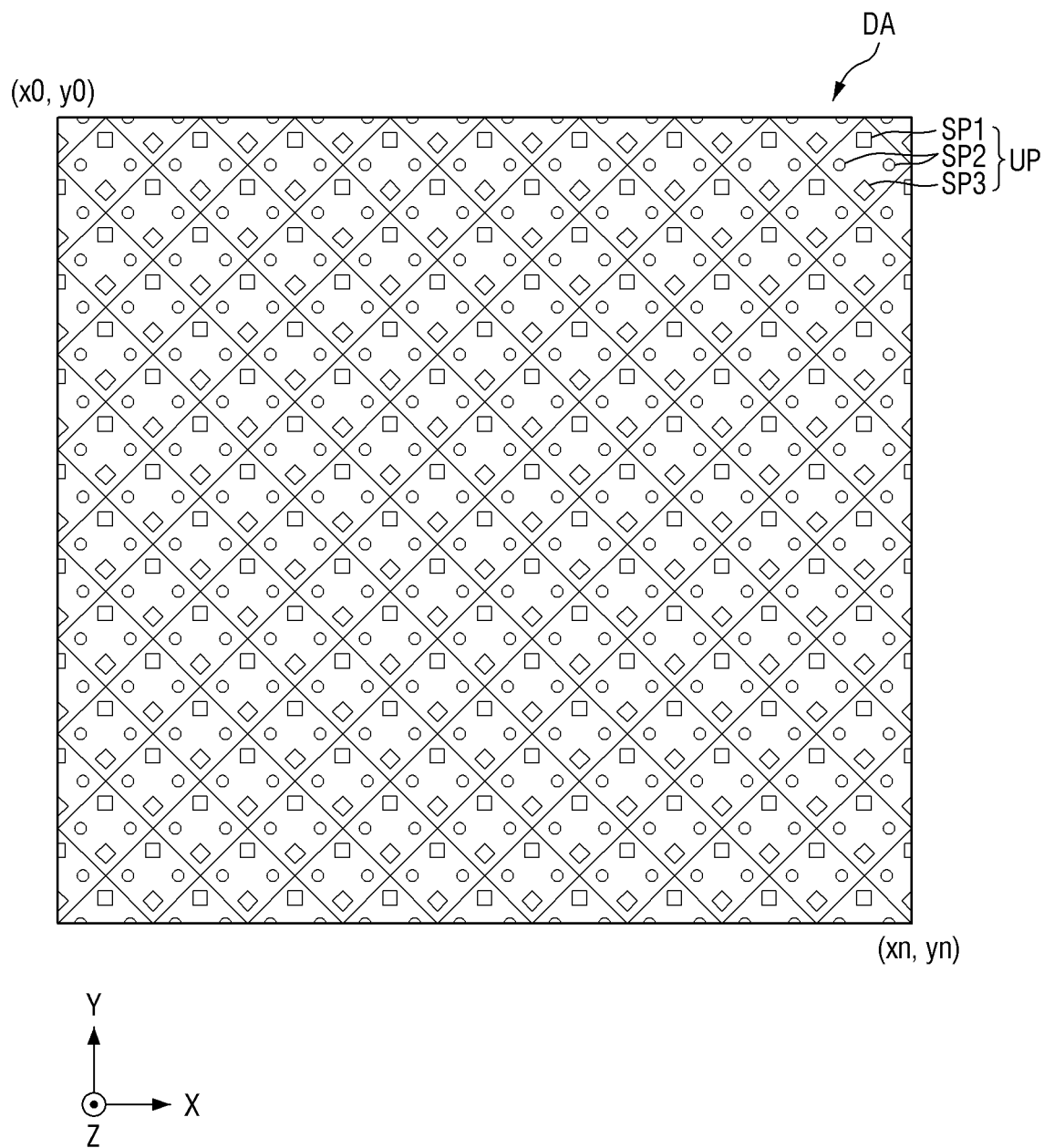
FIG. 14 is a plan view of an arrangement structure of sub-pixels of a display area according to an embodiment.

FIG. 14 is a plan view of an arrangement structure of sub-pixels of a display area according to an embodiment.

Referring to FIG. 14, in an embodiment, the display area DA of the display panel 110 includes a plurality of unit pixels UP or a plurality of sub-pixels SP1, SP2 and SP3. The plurality of sub-pixels SP1 SP2 and SP3 are arranged in a Pentile™ matrix. The display area DA includes more unit pixels UP as the resolution of the display device increases.

For example, each of the plurality of unit pixels UP includes first to third sub-pixels SP1, SP2 and SP3 arranged in the Pentile™ matrix. The first to third sub-pixels SP1 SP2 and SP3 are formed where n data lines and m scan lines intersect each other, where n and mm are positive integers.

Each of the plurality of sub-pixels arranged in the Pentile™ matrix includes a light-emitting element and a pixel circuit. The pixel circuit includes a driving transistor, at least one switching transistor and at least one capacitor that drive the light-emitting element of each of the plurality of sub-pixels.

Each of the plurality of unit pixels UP includes, but is not necessarily limited to, one first sub-pixel SP1, two second sub-pixels SP2, and one third sub-pixel SP3. In an embodiment, the first sub-pixel SP1 is a red sub-pixel, the second sub-pixel SP2 is a green sub-pixel, and the third sub-pixel SP3 is a blue sub-pixel. The size of the opening of each of the first to third sub-pixels SP1, SP2 and SP3 is determined depending on the luminance of light emitted by the sub-pixel. Accordingly, the size of the opening of each of the first to third sub-pixels SP1, SP2 and SP3 is adjusted to represent white light by mixing light emitted from a plurality of emissive layers. Each of the first to third sub-pixels SP1 SP2 and SP3 receives a data signal that includes luminance information for red, green or blue light from the display driver 120 and outputs light of the respective color.

Figure 15:
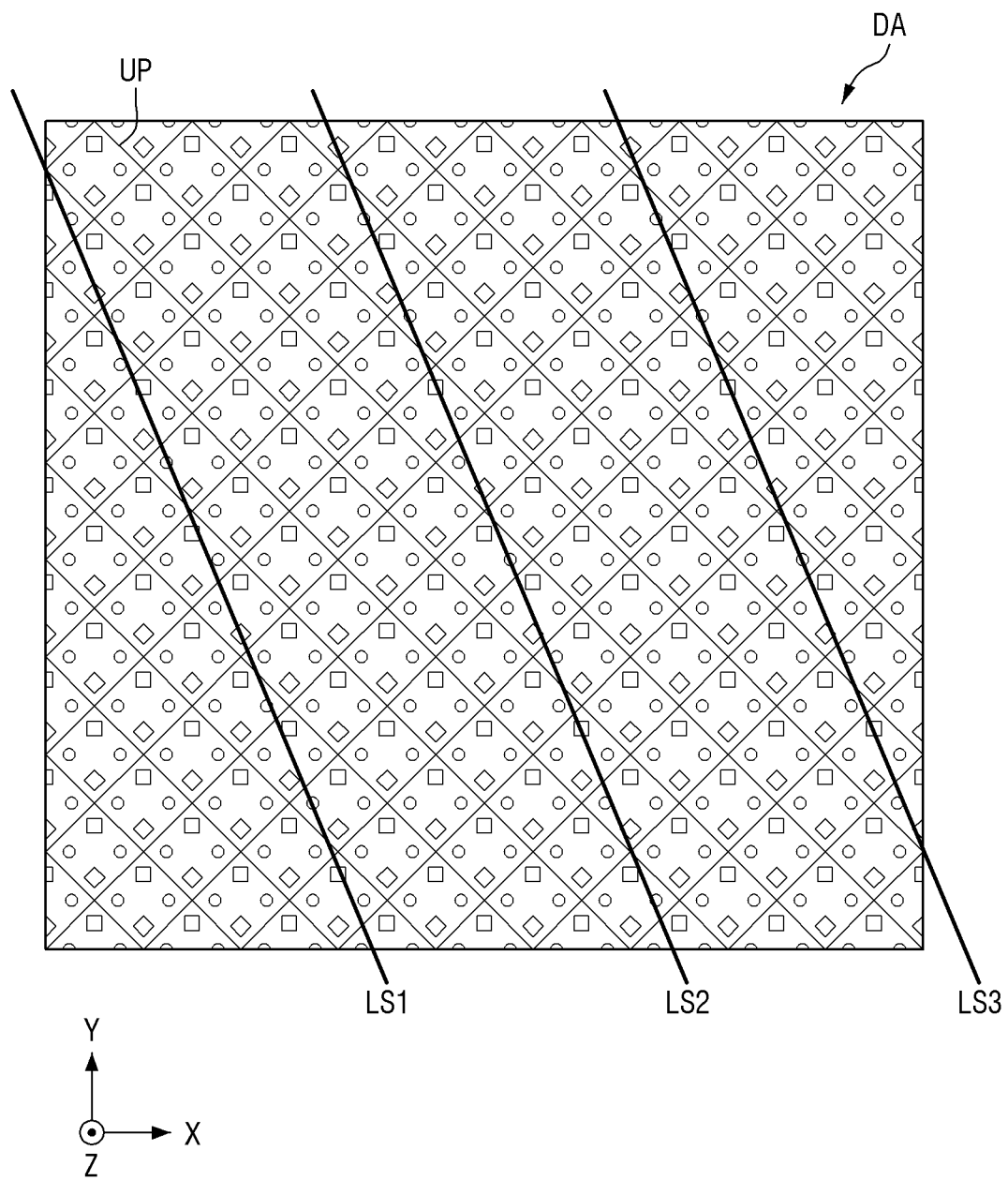
FIG. 15 illustrates a method of setting viewing point information on each of sub-pixels according to the slanted angle of the optical member and the lens width, according to an embodiment of the present disclosure.

FIG. 15 illustrates a method of setting viewing point information on each of sub-pixels according to the slanted angle of the optical member and the lens width, according to an embodiment of the present disclosure.

Referring to FIG. 15, in an embodiment, the slanted angle detector 320 of the alignment detecting unit 300 analyzes the slanted angle tθ of the image pattern displayed on the display panel 110, and detects the slanted angle of each of the stereoscopic lenses LS1, LS2 and LS3 associated with the slanted angle of the image pattern. Accordingly, the pixel position detector 330 detects the coordinates of the relative positions of the sub-pixels SP1, SP2 and SP3 that overlap each of the stereoscopic lenses LS1, LS2 and LS3 based on the information about the width Lw and the slanted angle tθ of each of the stereoscopic lenses LS1, LS2 and LS3.

In addition, the pixel position detector 330 detects the distance between the sub-pixels and the stereoscopic lenses by using the positions of the sub-pixels in the second (Y) direction, the size of each of the sub-pixels and the coordinates of the relative positions of the sub-pixels. The relative positions values of the sub-pixels SP1, SP2 and SP3 with respect to each of the stereoscopic lenses LS1. LS2 and LS3 is provided to the display driver 120 of the display module 100.

The viewpoint data generator 121 of the display driver 120 calculates a viewing point for each of the sub-pixels SP1, SP2 and SP3 according to the relative positions of the sub-pixels SP1, SP2 and SP3 with respect to each of the stereoscopic lenses LS1, LS2 and LS3, and designates a viewing point number for each of the sub-pixels SP1, SP2 and SP3 according to the viewing point. For example, the viewpoint data generator 121 calculates the target viewpoint for each of the sub-pixels SP1. SP2 and SP3 by calculating the relative positions values of the sub-pixels and the number of viewing points for each of the stereoscopic lens LS1, LS2 and LS3.

The image data corrector 122 generates corrected image data by correcting the positions of image data received from an external source in each of the horizontal lines and the alignment according to the positions and the viewing point number of each of the sub-pixels. As described above, according to a display devices according to embodiments and a panel bonding system that includes the same, the display panel 110 and the optical member 200 are first attached together, and then the viewing point information for the sub-pixels SP1, SP2 and SP3 is set according to the alignment of the sub-pixels SP1, SP2 and SP3 and the stereoscopic lenses 220, to display 3D images. For example, since the viewing point information for the sub-pixels SP1, SP2 and SP3 is set after the display panel 110 and the optical member 200 have been attached together, the time taken to bond the display panel 110 to the optical member 200 can be reduced, and fabrication cost can be saved. In this manner, the efficiency of bonding the display panel 110 to the optical member 200 is increased.

Figure 16:
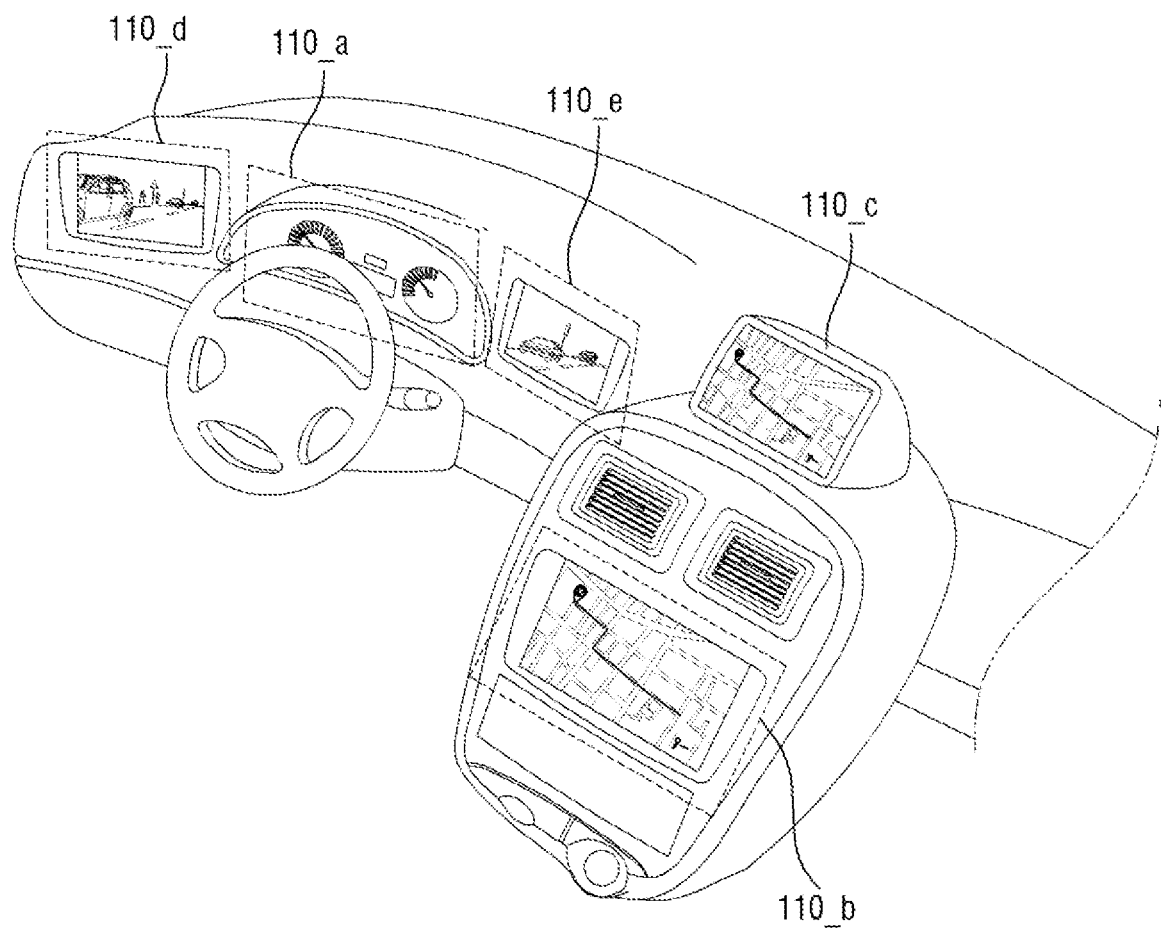
FIG. 16 illustrates an example of an instrument cluster and a center fascia including display devices according to an embodiment.

FIG. 16 illustrates an instrument cluster and a center fascia that include display devices according to an embodiment.

Referring to FIG. 16, a display device according to an embodiment in which the display module 100 and the optical member 200 are attached together is incorporated into the instrument cluster 110_a of a vehicle, the center fascia 110_b of a vehicle, or a center information display (CID) 110_c disposed on the dashboard of a vehicle. In addition, a display device according to an embodiment is incorporated into room mirror displays 110_d and 110_e that replace side mirrors and a navigation device, etc.

Figure 17:
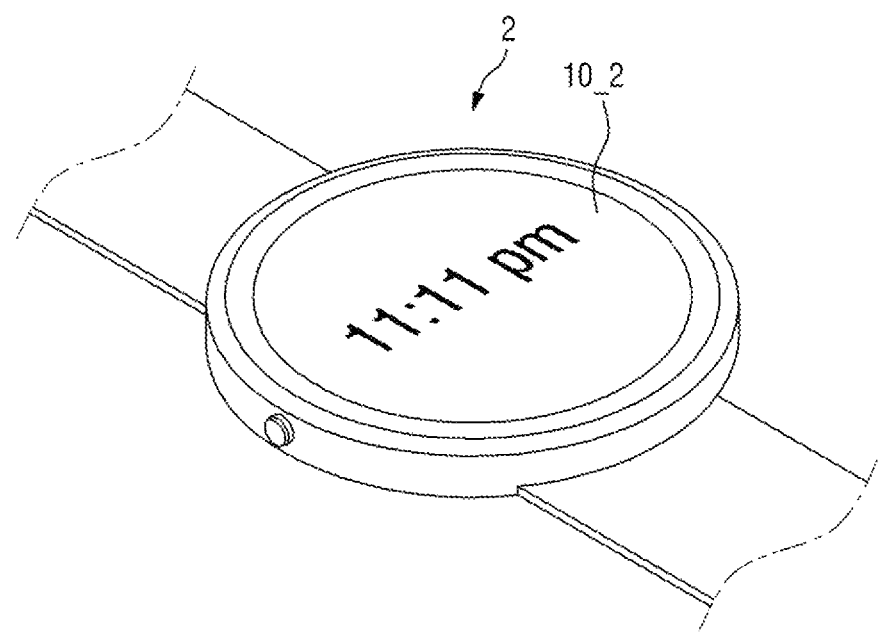
FIG. 17 illustrates a watch-type smart device that includes a display device according to an embodiment of the present disclosure.
Figure 18:
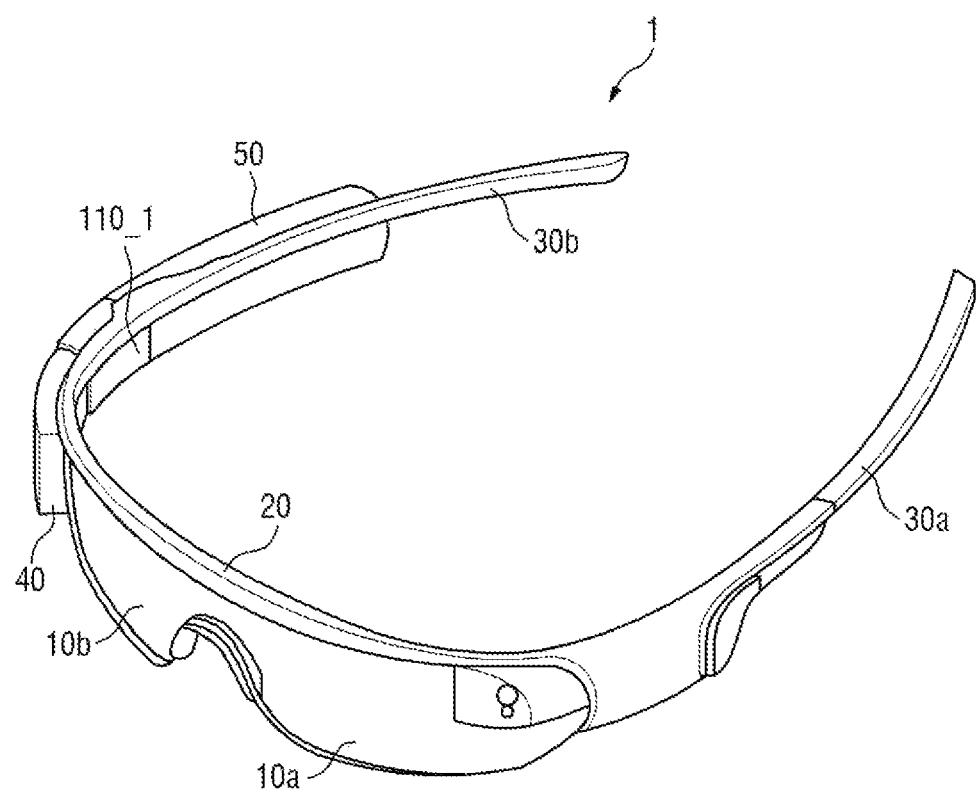
FIG. 18 illustrates a glasses-type virtual reality device that includes a display device according to an embodiment.

FIG. 17 illustrates an example of a watch-type smart device 2 that includes a display device 10_2 according to an embodiment of the present disclosure. FIG. 18 illustrates an example of a glasses-type virtual reality device that includes a display device according to an embodiment.

According to an embodiment, FIG. 18 shows an example of a glasses-type virtual reality device 1 that includes temples 30a and 30b. The glasses-type virtual reality device 1 according to an embodiment of the present disclosure includes a display device 110_1 according to an embodiment, a left eye lens 10a, a right eye lens 10b, a support frame 20, eyeglass temples 30a and 30b, a reflective member 40, and a display case 50.

The glasses-type virtual reality device 1 according to an embodiment is incorporated into a head-mounted display that includes a band that can be worn on the head instead of the temples 30a and 30b. For example, the glasses-type virtual reality device 1 is not necessarily limited to that shown in FIG. 18 but can be incorporated into a variety of electronic devices in a variety of forms.

The display case 50 includes the display device 110_1, such as a micro-LED display device, and the reflective member 40. An image displayed on the display device 10_1 is reflected by the reflective member 40 and provided to the user's right eye through the right eye lens 10b. Accordingly, a user can watch a virtual reality image displayed on the display device through the right eye.

Although the display case 50 is disposed at the right end of the support frame 20 in the example shown in FIG. 18, embodiments of the present disclosure are not necessarily limited thereto. For example, in an embodiment, the display case 50 is disposed at the left end of the support frame 20. For example, an image displayed on the display device 110_1 is reflected by the reflective member 40 and provided to the user's left eye through the left eye lens 10a. Accordingly, a user can watch a virtual reality image displayed on the display device 10_1 through the left eye. Alternatively, in an embodiment, the display cases 50 are disposed at both the left and right ends of the support frame 20, respectively. For example, a user can watch a virtual reality image displayed on the display device 10_1 through both the left and right eyes.

Figure 19:
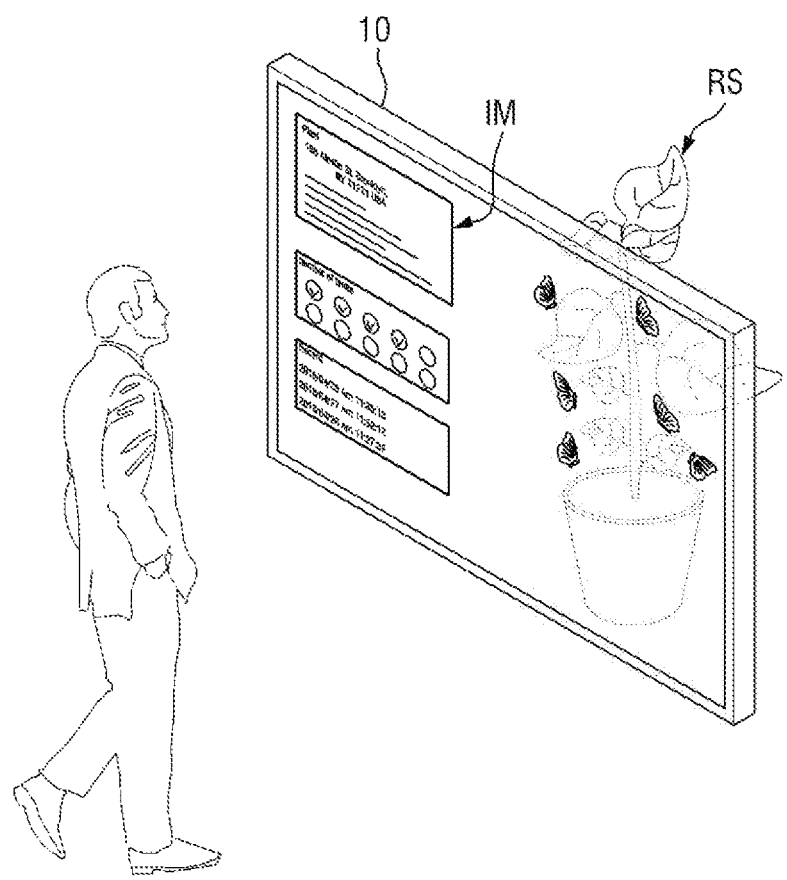
FIG. 19 illustrates a transparent display device that includes a transparent display device according to an embodiment.

FIG. 19 illustrates a transparent display device that includes a transparent display device according to an embodiment.

Referring to FIG. 19, in an embodiment, a display device in which the display module 100 and the optical member 200 (see FIG. 2) are attached together is incorporated into a transparent display device. The transparent display device transmits light while displaying images IM. Therefore, a user located on the front side of the transparent display device can not only watch the images IM being displayed on the display module 100 but also watch an object RS located on the rear side of the transparent display device or the background through the transparent display device. When a display device that includes the display module 100 and the optical member 200 attached together is incorporated into a transparent display device, the display panel 10 of the display device includes a light-transmitting portion that can transmit light or is made of a material that can transmit light.

In concluding the detailed description, those skilled in the art will appreciate that many variations and modifications can be made to embodiments without substantially departing from the principles of embodiments of the present disclosure. Therefore, embodiments of the disclosure are used in a generic and descriptive sense only and not for purposes of limitation.

What is claimed is:

1. A panel bonding system, comprising:
   a display device that displays images; and
   a bonding apparatus that bonds an optical member to the display device,
   wherein the bonding apparatus comprises:
   an optical member bonding unit that bonds the optical member to the display device; and
   an alignment detecting unit that sequentially detects coordinates of positions of a plurality of sub-pixels in a display area of the display device, slanted angles of stereoscopic lenses in the optical member, and coordinates of relative positions of the sub-pixels with respect to each of the stereoscopic lenses.

2. The system of claim 1, wherein the display device comprises:
   a display panel that includes the display area and the plurality of sub-pixels in the display area;
   the optical member attached to the display panel and that includes the stereoscopic lenses; and
   a display driver that
   receives information on relative positions of the sub-pixels for each of the stereoscopic lenses of the optical member from the bonding apparatus, and that corrects image data based on the relative positions of the sub-pixels so that 3D images are displayed in a display area of the display panel.

3. The system of claim 2, wherein the optical member bonding unit aligns an alignment mark of the display panel with a flat portion of the optical member and attaches the optical member to a front surface or the display area of the display panel.

4. The system of claim 2, wherein the alignment detecting unit comprises:
   a position coordinate detector that detects coordinates of a position of each of the sub-pixels in the display area;
   a slanted angle detector that analyzes an image pattern displayed on the display panel and detects slanted angles of the stereoscopic lenses; and
   a pixel position detector that detects coordinates of relative positions of the sub-pixels with respect to each of the stereoscopic lenses based on information about a width and a slanted angle of each of the stereoscopic lenses.

5. The system of claim 4, wherein the position coordinate detector
   designates a sub-pixel located at one of an upper left end, an upper right end, a lower left end, a lower right end, or a center of the display area as a reference pixel, and sequentially detects coordinates of positions of other sub-pixels based on the reference pixel.

6. The system of claim 5, wherein the display driver
   drives the display area of the display panel so that an image of a predetermined image pattern is displayed on the display area, and
   receives position coordinate information for all of the sub-pixels from the position coordinate detector.

7. The system of claim 4, wherein the position coordinate detector detects distance values between the sub-pixels and the stereoscopic lenses using the positions of the sub-pixels arranged in first and second directions, sizes of the sub-pixels, and the coordinates of relative positions of the sub-pixels.

8. The system of claim 7, wherein the position coordinate detector calculates values of relative positions of the sub-pixels that overlap each of the stereoscopic lenses by using the distance values between the sub-pixels and the stereoscopic lenses and a remaining width of each of the stereoscopic lenses.

9. The system of claim 2, wherein the display driver calculates viewing points of the sub-pixels according to the relative positions of the sub-pixels with respect to each of the stereoscopic lenses and designates a viewing point number for each sub-pixel.

10. The system of claim 9, wherein the display driver
    generates corrected image data by correcting a position and alignment of the image data in each horizontal line according to the coordinates of the positions of the sub-pixels and the viewing point numbers, and
    drives the display area wherein 3D images according to the corrected image data is displayed.

11. The system of claim 2, wherein the display driver comprises:
    a viewpoint data generator that calculates a number of viewing points for the sub-pixels according to the relative positions of the sub-pixels, and designates a viewing point number for each sub-pixel according to the number of viewing points of the sub-pixels;

an image data corrector that generates corrected image data by correcting a position and alignment of the image data in each horizontal line; and a main processor that generates data voltages that correspond to the corrected image data so that the 3D images are displayed in the display area.

12. The system of claim 11, wherein the viewpoint data generator calculates a target viewpoint for each of the sub-pixels by calculating values of relative positions of the sub-pixels and a number of viewing points for each of the stereoscopic lens, and designates a target viewpoint or a target viewpoint value for each of the sub-pixels as the viewing point.

13. The system of claim 11, wherein the viewpoint data generator calculates a target viewpoint for each of the sub-pixels by calculating values of relative positions of the sub-pixels and a number of viewing points for each of the stereoscopic lens, and renders the target viewpoint for each of the sub-pixels by adding or subtracting a viewpoint number according to fractional part of the target viewpoint for each of the sub-pixels.

14. A method of aligning a display panel with a flat portion of an optical member when attaching the optical member on a front surface of the display panel, comprising:

sequentially detecting position coordinates of sub-pixels in a display area of a display panel as an optical member is attached to the front surface of the display area;

driving the display panel wherein an image of a predetermined image pattern is displayed in the display area;

analyzing a slanted angle of the predetermined image pattern and detecting the slanted angle of each stereoscopic lens of the optical member associated with a slanted angle of the predetermined image pattern;

detecting coordinates of relative positions of the sub-pixels that overlap each of the stereoscopic lenses based on information about a width and the slanted angle of each of the stereoscopic lenses;

generating a viewing point for each of the sub-pixels according to relative positions of the sub-pixels with respect to each of the stereoscopic lenses, and designating a viewing point number for each of the sub-pixels according to the viewing point; and generating data voltages that correspond to corrected image data and supplying the data voltages to data lines, wherein images are displayed according to the relative positions of the sub-pixels with respect to the stereoscopic lenses.

* * * * *